(12) United States Patent
Nam et al.

(10) Patent No.: US 7,173,625 B2
(45) Date of Patent: Feb. 6, 2007

(54) THREE-DIMENSIONAL ANIMATION SYSTEM AND METHOD USING EVOLUTIONARY COMPUTATION

(75) Inventors: Seung Woo Nam, Daejeon (KR); In Ho Lee, Daejeon (KR); Hyun Bin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 326 days.

(21) Appl. No.: 10/842,489

(22) Filed: May 11, 2004

(65) Prior Publication Data
US 2005/0007371 A1    Jan. 13, 2005

(30) Foreign Application Priority Data
Aug. 7, 2003    (KR)    ............... 10-2003-0054533

(51) Int. Cl.
*G06T 15/70*    (2006.01)
(52) U.S. Cl. ..................................... 345/473
(58) Field of Classification Search .............. 345/473, 345/419; 463/31
See application file for complete search history.

(56) References Cited

U.S. PATENT DOCUMENTS

| 5,136,686 | A | 8/1992 | Koza |
| 6,545,682 | B1 | 4/2003 | Ventrella et al. |
| 6,563,503 | B1 | 5/2003 | Comair et al. |
| 2004/0053690 | A1* | 3/2004 | Fogel et al. .................. 463/31 |

* cited by examiner

*Primary Examiner*—Kimbinh T. Nguyen
(74) *Attorney, Agent, or Firm*—Mayer Brown Rowe & Maw LLP

(57) ABSTRACT

A three-dimensional animation system using evolutionary computation includes a gene determination unit and a motion generation unit. The gene determination unit calculates modified gene information by receiving at least one genes and modifying the genes evolutionarily. The motion generation unit receives motion data and modifies the motion data based on the modified gene information. A three-dimensional animation method is also disclosed.

18 Claims, 6 Drawing Sheets

THREE-DIMENSIONAL ANIMATION SYSTEM AND METHOD USING EVOLUTIONARY COMPUTATION

FIELD OF THE INVENTION

The present invention relates to a three-dimensional animation; and more particularly, to a three-dimensional animation system and method using evolutionary computation, which implement the motion of a character by applying the theory of evolution to games, the human crowd scene in movies using computer graphic techniques, etc. where the characters who require evolution exist.

BACKGROUND OF THE INVENTION

Recently, a number of games using three-dimensional (3D) animation have come out, and avatar animations have come out on the Internet. In particular, in games, the motion of the child character of a specific character is implemented in such a way that an animator directly edits key-frame data or modifies captured data.

However, the method of implementing the motion of a child character in such a way that an animator directly edits key-frame data or modifies captured data is problematic in that excessive time and a lot of resources are required and further it is difficult to keep the features of parent characters in the child character.

Furthermore, when human crowd simulation appearing in recent movies is taken as an example, a problem arises in that, when the scene, in which several hundred persons run, is produced, respective persons generally take the same motion, so that the motions of the respective persons are not distinguished from each other without having distinct personalities.

SUMMARY OF THE INVENTION

It is, therefore, an object of the present invention to provide a 3D animation system and method using evolutionary computation, which are capable of reducing the use of a tool for correcting the motion of a character and exhibiting the features of the character by implementing a child character using evolutionary computation.

In accordance with the present invention, there is provided a 3D animation system using evolutionary computation including: a gene determination unit for calculating modified gene information by receiving at least one gene and modifying the received genes evolutionarily; and a motion generation unit for receiving a motion data from motion database and modifying the motion data based on the modified gene information.

In accordance with the present invention, there is provided a 3D animation method including the steps of: receiving at least two gene; dividing each of the received genes into n-bit gene parts and allocating the n-bit gene parts indices, respectively; calculating modified gene information by crossing the received two genes (first and second genes) with each other with respect to each identical index; and receiving motion data and modifying the received motion data based on the modified gene information.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
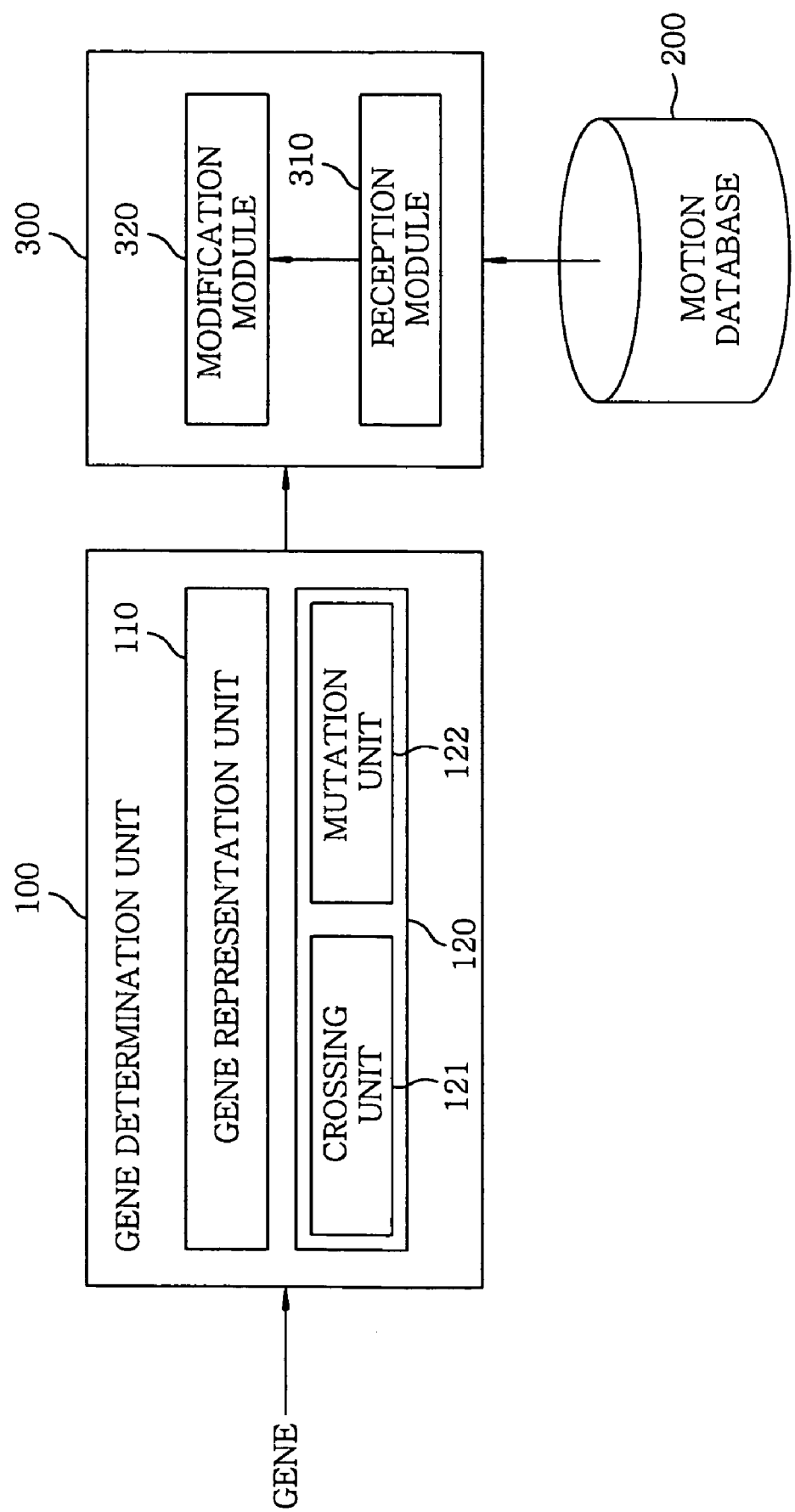
FIG. 1 is a diagram illustrating the entire construction of a 3D animation system using evolutionary computation in accordance with the present invention.

Preferred embodiments of the present invention will now be described in detail with reference to the accompanying drawings, wherein like parts appearing in FIGS. 2 to 5 are represented by like reference numerals.

The technical gist of the present invention is to conserve the features of parent characters in a child character, rather than forming the uniform motion of a child character, in such a way as to calculate modified gene information by receiving one or more genes and modifying the received genes evolutionarily, and modify random input motion data using the modified gene information.

Figure 2:
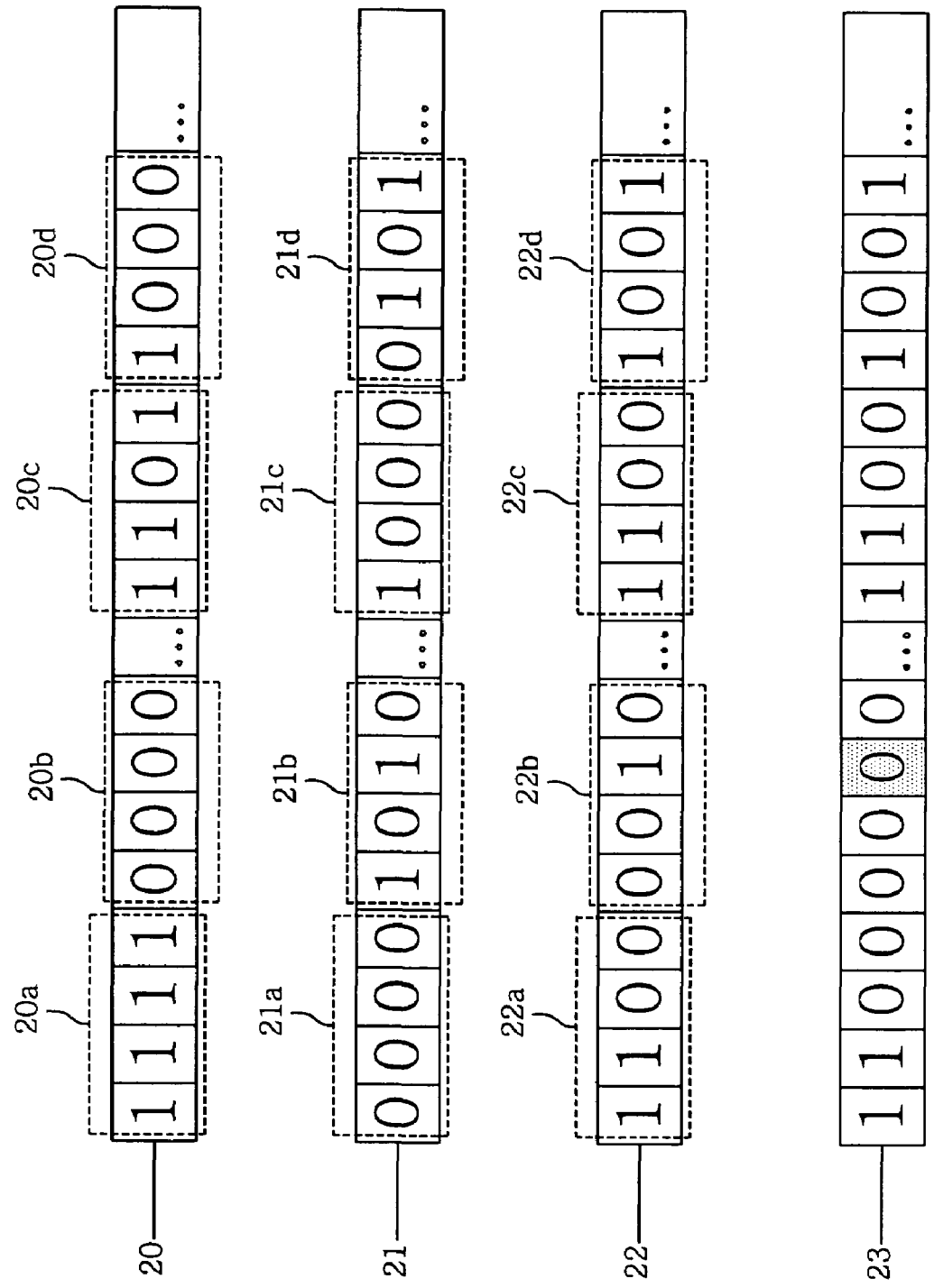
FIG. 2 is a view illustrating gene representation and evolutionary computation that are performed in the gene determination unit of the 3D animation system.
Figure 3A:
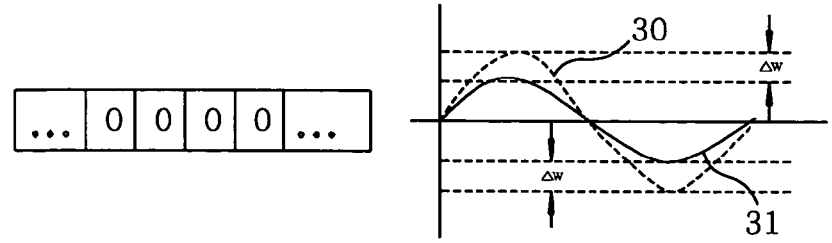
FIGS. 3a to 3e are graphs illustrating the angular modification of the rotation values of a joint in the motion modification based on gene information determined according to the present invention.
Figure 3B:
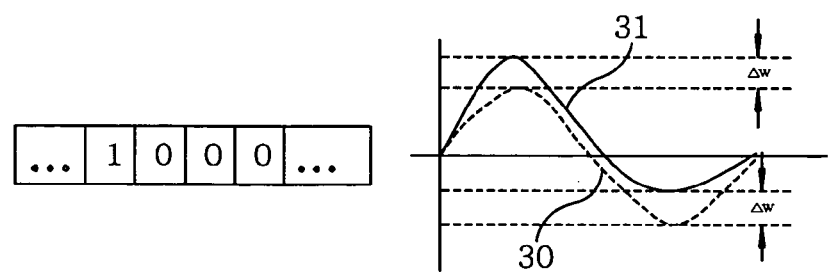
Figure 3C:
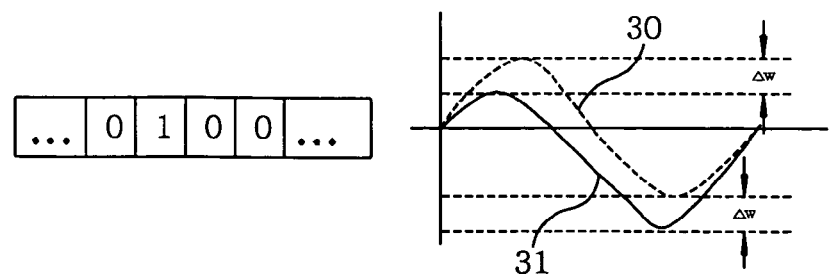
Figure 3D:
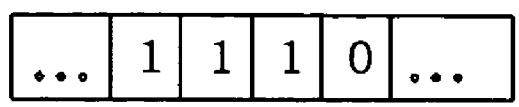
Figure 3D:
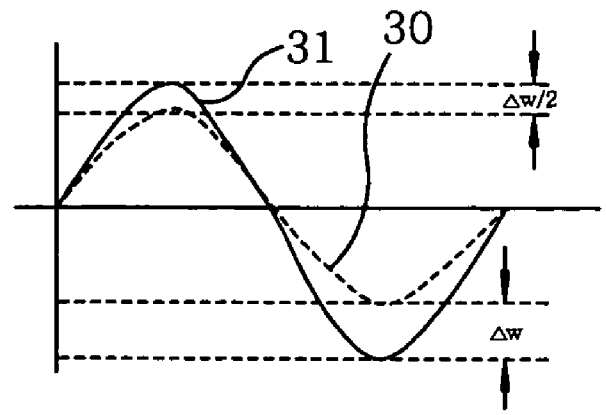
Figure 3E:
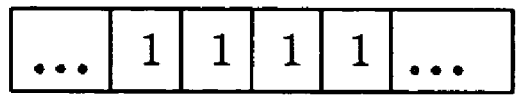
Figure 3E:
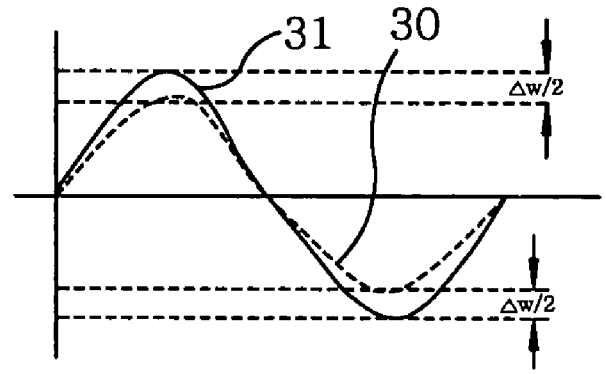

FIG. 1 is a diagram illustrating the entire construction of a 3D animation system using evolutionary computation in accordance with the present invention. FIG. 2 is a view illustrating gene representation and evolutionary computation that are performed in the gene determination unit of the 3D animation system.

As illustrated in FIG. 1, the 3D animation system using evolutionary computation according to the present invention includes a gene determination unit 100 calculating k-bit (k=m) modified gene information by receiving one or more genes each composed of m bits and modifying the genes evolutionarily, a motion database 200 storing motion data, and a motion generation unit 300 modifying received motion data from the motion database 200 using the modified gene information.

In this case, the motion data stored in the motion database 200 includes the rotation values of joints and the time variations of the rotation values of the joints attributable to the movement of the joints when a character undergoes a movement, such as walking, running or jumping.

The modified gene information calculated in the gene determination unit 100 and the m-bit input genes are each composed of bits related to the angular modification of the rotating values of a joint and bits related to the temporal modification of the time variations of the rotation values of the joint.

The gene determination unit 100 is composed of a gene representation unit 110 and an evolutionary computation unit 120 composed of a crossing unit 121 and a mutation unit 122.

Gene representation and evolutionary computation are described using examples. With respect to each of the joints of a character, there exist bits related to the angular modification of the rotation values of the joint and the temporal modification of the time variations of the rotation values of the joint, and the number of the bits representing the angular modification of the rotation values and the temporal modification of the time variations of the rotation values may vary.

The gene representation unit 110 divides a received m-bit gene into n-bit gene parts, and allocates indices to the n-bit gene parts, respectively. That is, as shown in FIG. 2, the gene representation unit 110 divides an input father gene 20 into, e.g., 4-bit gene parts, and then allocates index 1 and index 2 to a first 4-bit gene part and a second 4-bit gene part, respectively.

In the same manner, the gene representation unit 110 divides an input m-bit mother gene 21 into, e.g., 4-bit gene parts, and then allocates indices to the 4-bit gene parts, respectively, for example, index 1 and index 2 to a first 4-bit gene part and a second 4-bit gene part, respectively.

In such father and mother genes 20 and 21, bits related to the angular modification of the rotation values of joints, such as 20a, 21a, 20b, 21b, 20c and 21c, and bits related to the temporal modification of the time variations of the rotation values of the joints, such as 20d and 21d, are included.

When the crossing unit 121 receives two genes allocated the indices (a first gene and a second gene), the crossing unit 121 calculates m-bit modified gene information by crossing the two genes with each other with respect to each of the same indices. That is, as shown in FIG. 2, when the father and mother genes 20 and 21 allocated the indices are received, the crossing unit 121 acquires a first 4-bit information part 22a of the modified gene information 22 by crossing the first 4-bit gene part of the father gene 20 allocated the index 1 with the first 4-bit gene part of the mother gene 21 allocated the index 1. In this case, the crossing unit 121 acquires the front two bits of the first information part 22a of the modified gene information 22 using the front two bits of the first gene part 20a of the father gene 20 that are allocated the index 1, and calculates the back two bits of the first information part 22a of the modified gene information 22 using the back two bits of the first gene part 21a of the mother gene 21 that are allocated the index 1. The crossing unit 121 calculates the modified gene information 22 by repeatedly performing the above-described process with respect to the respective same indices.

Although in the preferred embodiment of the present, the case where the modified gene information is calculated by crossing the two genes with respect to each of the same indices has been cited as an example, modified gene information may be calculated by crossing the two genes that are allocated different indices in another embodiment. For example, the crossing unit 121 may calculate the modified gene information by crossing the 4-bit gene part 20b of the father gene 20 allocated index 2 with the 4-bit gene part 21a of the mother gene 21 allocated index 1.

Furthermore, although in the preferred embodiment of the present invention, the case where the front two bits of the modified gene information 22 are calculated using the front two bits of the father gene 20 allocated index 1 and the back two bits of the modified gene information 22 are calculated using the back two bits of the mother gene 21 allocated index 1 has been described, the front two bits of the modified gene information 22 may be calculated using the back two bits of the mother gene 21 allocated index 1 and the back two bits of the modified gene information 22 may be calculated using the front two bits of the father gene 20 allocated index 1.

The mutation unit 122 calculates mutated gene information using methods, such as a method of changing at least one bit of a gene received by the gene presentation unit 110 or modified gene information calculated by the crossing unit 121.

That is, as shown in FIG. 2, when the crossing unit 121 outputs the modified gene information 22, the mutation unit 122 creates mutated gene information 23 using a method of changing, for example, the seventh of the bits of the modified gene information 22.

The modified gene information calculated by the crossing unit 121 and the mutated gene information created by the mutation unit 122 are input to the motion generation unit 300.

The motion generation unit 300 includes a motion reception module 310 receiving motion data from the motion database 200, and a modification module 320 changing motion by applying modified gene information or mutated gene information, which is input from the gene determination unit 100, to motion data. The received motion data may be a motion modified in the modification module 320, or predefined motion. In this case, the modification module 320 modifies the motion data based on restrictions on the rotation angles of the joints of a character, smoothing and inverse kinematics.

Hereinafter, a process in which the motion generation unit 300 modifies a motion through the modification of motion data using modified gene information or mutated gene information is described with reference to FIGS. 3a to 3e and 4a to 4e. FIGS. 3a to 3e are graphs illustrating the angular modification of the rotation values of a joint in the modification of a motion based on gene information determined according to the present invention. FIGS. 4a to 4e are graphs illustrating the temporal modification of time variations of the rotation values of a joint in the modification of a motion based on gene information determined according to the present invention.

The angular modification of the rotation values of a joint in the modification of a motion based on gene information is described below.

The graphs shown in FIGS. 3a to 3e show the time variations of rotation values of the joint, in which the vertical axis thereof represents the rotation angle values w of the joint that belong to quaternion values (w, x, y, z), and the horizontal axis thereof represents time. Furthermore, in the graphs of FIGS. 3a to 3e, the dotted curves thereof represent first rotation values corresponding to motion data received from the motion database 300, and the solid curves thereof represent second rotation values 31 of a modified motion obtained by applying modified gene information or mutated gene information to the motion data.

In the modification of first rotation values 30 to second rotation values 31 based on modified gene information or mutated gene information, the respective n-bit parts of the modified gene information or mutated gene information are utilized and n is the number of bits that was used to divide the input m-bit genes. That is, the second rotation values 31 are calculated by applying the respectively n-bit parts of the modified gene information or mutated gene information, which correspond to specific indices, respectively, to the first rotation values 30.

When the number of bits of a gene to be applied is n, the amounts of modification of the rotation values can be represented over $2^{(n/2-1)}$ sections. That is, when the number of bits of a gene to be applied is four, the amounts of modification of the rotation values are represented over two sections.

Furthermore, when the number of bits of a gene part to be applied is n, the amount of modification $\Delta w$ is represented over $2^{(n/2-1)}$ sections. That is, when the number of bits of a gene part to be applied is 4, the amount of modification Δw is represented over two sections.

For the convenience of description, a process in which the modification module 320 of the motion generation unit 300 calculates the second rotation values 31 from the first rotation values 30 corresponding to the motion data using modified gene information or mutated gene information is described, with modified gene information or mutated gene information, in which information on a specific joint is composed of 4 bits, being cited as an example.

With reference to FIGS. 3a to 3e, the modification module 320 causes the absolute values of the second rotation values 31 to be smaller than the first rotation values 30 when the 4 bits of the modified gene information or mutated gene information, which correspond to the specific joint, are "0000," and causes the absolute values of the second rotation values 31 to be larger than the first rotation values 30 when the 4 bits of the modified gene information or mutated gene information are "1111."

When the 4 bits of the modified gene information or mutated gene information, which corresponds to the specific joint, are "0100," the modification module 320 calculates the second rotation values 31 that start with an absolute value smaller than a corresponding first rotation value 30 and gradually increases to an absolute value larger than a corresponding first rotation value 30, and modifies the received motion data. When the 4 bits are "1000," the modification module 320 calculates the second rotation values 31 that start with an absolute value larger than a corresponding first rotation value 30 and gradually decreases to an absolute value smaller than a corresponding first rotation value 30, and modifies the received motion data. When the 4 bits are "1110," the modification module 320 calculates the second rotation values 31 that start with an absolute value larger than a corresponding first rotation value 30 and has an increasing amount of modification, and modifies the received motion data.

Thereafter, a process of modifying the trace of rotation values corresponding to a specific joint according to the bits of modified gene information or mutated gene information that determine temporal variations of the rotation values of the specific joint is described using an example.

FIGS. 4a to 4e are graphs showing the time variations of the rotation values of a joint, in which the vertical axis thereof represents the rotation values w of the joint that belong to quaternion values (w, x, y, z), and the horizontal axis thereof represents time. Furthermore, in the graphs of FIGS. 4a to 4e, the dotted curves thereof represent first rotation values corresponding to motion data received from the motion database 300, and the solid curves thereof represent second rotation values 31 of a modified motion obtained by applying modified gene information or mutated gene information to motion data.

Figure 4A:
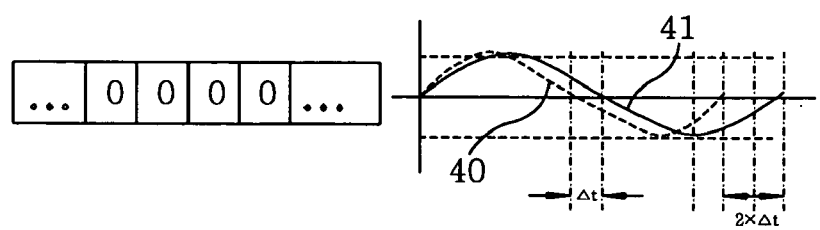
FIGS. 4a to 4e are graphs illustrating the temporal modification of the rotation values of a joint in the motion modification based on gene information determined according to the present invention.
Figure 4B:
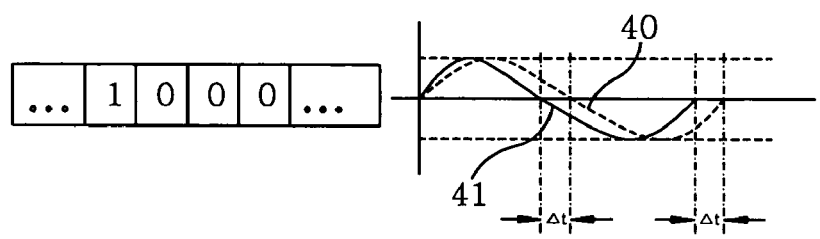
Figure 4C:
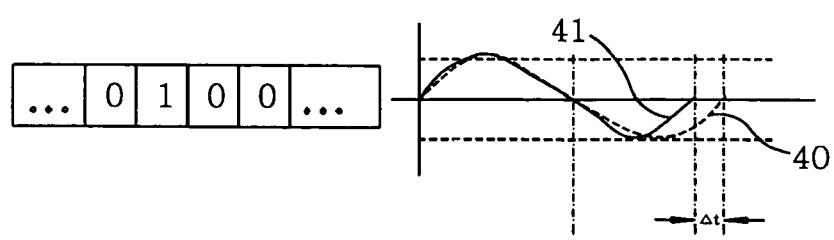

With reference to FIGS. 4a to 4e, the modification module 320 modifies a motion corresponding to the motion data into a slow motion slowed by 2×Δt as shown in FIG. 4a when the 4 bits of the modified gene information or mutated gene information, which correspond to the specific joint, are "0000," and modifies the motion corresponding to the motion data into a fast motion speeded by Δt as shown in FIG. 4b when the 4 bits of the modified gene information or mutated gene information, which correspond to the specific joint, are "0000."

Figure 4D:
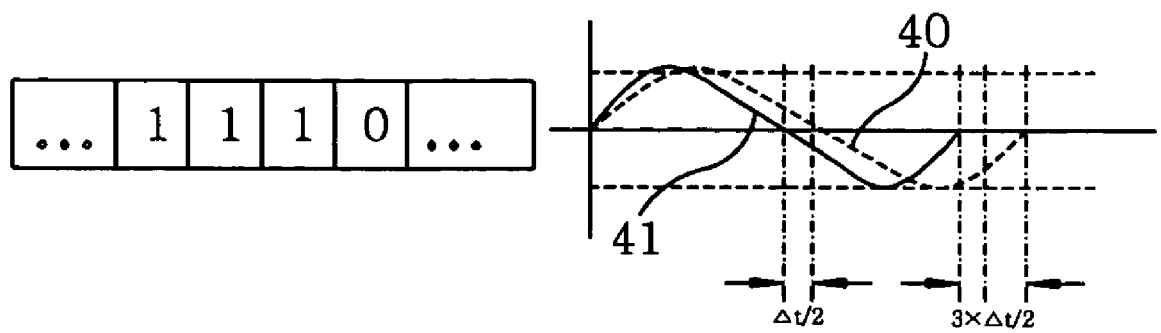

When the 4 bits of the modified gene information or mutated gene information, which correspond to the specific joint, are "0100," the modification module 320 modifies the motion corresponding to the motion data into a fast motion speeded by Δt as shown in FIG. 4b. When the 4 bits of the modified gene information or mutated gene information, which correspond to the specific joint, are "1110," the modification module 320 modifies the motion corresponding to the motion data into a fast motion speeded by 3×Δt/2 as shown in FIG. 4d.

Figure 4E:
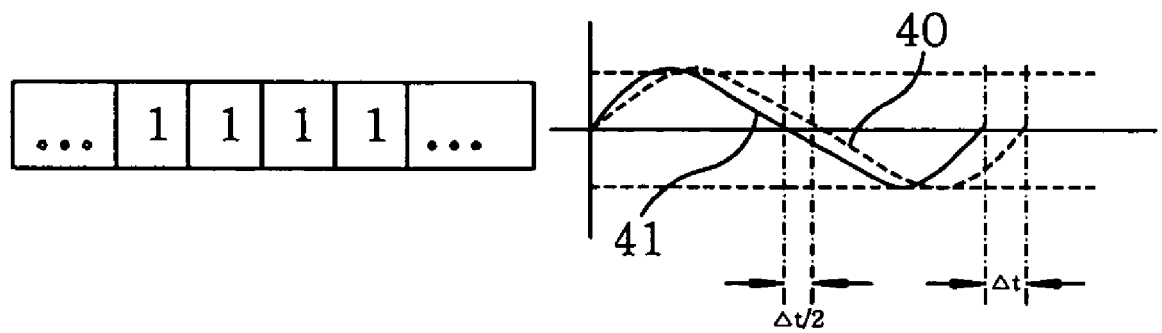

When the 4 bits of the modified gene information or mutated gene information, which correspond to the specific joint, are "1111," the modification module 320 modifies the motion corresponding to the motion data into a fast motion speeded by Δt as shown in FIG. 4e.

Although in the above description, the angular modification of the rotation values of a joint and the temporal modification thereof have been described using 4-bit genes, the modification of the motion of the joint becomes minute in proportion to the number of bits.

As described above, in accordance with the present invention, the correction of the motion of a character using an animation tool can be reduced by calculating modified gene information in such a way as to modify input parent genes using evolutionary computation and modifying the motion of a child character using the calculated gene information.

Furthermore, in accordance with the present invention, a specific motion can be modified to exhibit the features of a character in crowd animation by creating modified gene information based on genes and applying the modified gene information to the motion of the character.

While the invention has been shown and described with respect to the preferred embodiments, it will be understood by those skilled in the art that various changes and modifications may be made without departing from the spirit and scope of the invention as defined in the following claims.

What is claimed is:

1. A three-dimensional (3D) animation system using evolutionary computation comprising:
   a gene determination unit for calculating modified gene information by receiving at least one gene and modifying the genes evolutionarily, wherein the gene determination unit includes:
      a gene representation unit for dividing each of the received genes into n-bit gene parts and allocating the n-bit gene parts indices, respectively;
      a crossing unit for calculating the modified gene information by crossing received first and second genes with each other with respect to each identical index; and
      a mutation unit for calculating mutated gene information by changing at least one bit of the input genes or the modified gene information obtained in the crossing unit; and
   a motion generation unit for receiving motion data and modifying the motion data based on the modified gene information.

2. The 3D animation system of claim 1, wherein each of the genes includes information on rotation values of each joint and time variations of the rotation values of the joint.

3. The 3D animation system of claim 1, wherein the modified gene information obtained in the crossing unit is obtained by calculating partial, modified gene information corresponding a specific index in such a way as to combine front n/2 bits of the n-bit gene part of the first gene, which are allocated the specific index, with back n/2 bits of the n-bit gene part of the second gene, which are allocated the specific index, and repeatedly performing the calculating of the partial, modified gene information with respect to all the indices.

4. The 3D animation system of claim 1, wherein the modified gene information obtained in the crossing unit is obtained by calculating partial, modified gene information corresponding a specific index in such a way as to combine front n/2 bits of the n-bit gene part of the second gene, which are allocated the specific index, with back n/2 bits of the n-bit gene part of the first gene, which are allocated the specific index, and repeatedly performing the calculating of the partial, modified gene information with respect to all the indices.

5. The 3D animation system of claim 1, wherein the mutation unit calculates the mutated gene information by changing at least one bit of the modified gene information obtained in the crossing unit.

6. The 3D animation system of claim 1, wherein the crossing unit crosses each of the gene parts of the first gene allocated a first index with a gene part of the second gene allocated any of second indices different from the first index.

7. The 3D animation system of claim 1, wherein each of the genes includes information on rotation values of each joint and time variations of the rotation values of the joint.

8. The 3D animation system of claim 2, wherein the motion generation unit modifies the received motion data using the modified gene information obtained in the crossing unit or the mutated gene information.

9. The 3D animation system of claim 2, wherein, when modifying the received motion data using the modified gene information or mutated gene information, the motion generation unit applies the modification to each n-bit part of the motion data and represents an angular modification of the rotation values or temporal modification of the rotation values over $2^{(n/2-1)}$ sections.

10. The 3D animation system of claim 1, wherein the received motion data is the motion modified in the motion generation unit, or a predefined motion.

11. A 3D animation method comprising the steps of:
receiving first and second genes;
dividing each of the received genes into n-bit gene parts and allocating the n-bit gene parts indices, respectively;
calculating modified gene information by crossing the received first and second genes with each other with respect to each identical index; and
receiving motion data and modifying the received motion data based on the modified gene information.

12. The 3D animation method of claim 11 further comprising the steps of:

calculating mutated gene information by changing at least one bit of the received genes; and
modifying the received motion data based on the mutated gene information.

13. The 3D animation method of claim 11 further comprising the step of calculating mutated gene information by changing at least one bit of the calculated modified gene information;
wherein the step of modifying the received motion data is performed by modifying the received motion data based on the mutated gene information.

14. The 3D animation method of claim 11, wherein the modified gene information is calculated by calculating partial, modified gene information corresponding a specific index in such a way as to combine front n/2 bits of the n-bit gene part of the first gene, which are allocated the specific index, with back n/2 bits of the n-bit gene part of the second gene, which are allocated the specific index, and repeatedly performing the calculating of the partial, modified gene information with respect to all the indices.

15. The 3D animation method of claim 11, wherein the modified gene information is calculated by calculating partial, modified gene information corresponding a specific index in such a way as to combine front n/2 bits of the n-bit gene part of the second gene, which are allocated the specific index, with back n/2 bits of the n-bit gene part of the first gene, which are allocated the specific index, and repeatedly performing the calculating of the partial, modified gene information with respect to all the indices.

16. The 3D animation method of claim 11, wherein the modified gene information is calculated by crossing each of the gene parts of the first gene allocated a first index with a gene part of the second gene allocated any of second indices different from the first index.

17. The 3D animation method of claim 11, wherein each of the genes includes information on rotation values of each joint with lapse of time and time variations of the rotation values of the joint.

18. The 3D animation method of claim 11, wherein the step of modifying the received motion data using the modified gene information is performed by applying the modification to each n-bit part of the motion data and representing an angular modification of the rotation values or a temporal modification of the rotation values over $2^{(n/2-1)}$ sections.

* * * * *